US005794209A

United States Patent [19]
Agrawal et al.

[11] Patent Number: 5,794,209
[45] Date of Patent: *Aug. 11, 1998

[54] SYSTEM AND METHOD FOR QUICKLY MINING ASSOCIATION RULES IN DATABASES

[75] Inventors: Rakesh Agrawal; Ramakrishnan Srikant, both of San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 415,006

[22] Filed: Mar. 31, 1995

[51] Int. Cl.$^6$ .................................................. G06F 17/60
[52] U.S. Cl. .................................................. 705/10; 707/5
[58] Field of Search .................................. 395/600, 210; 364/403; 705/10; 707/3, 5

[56] References Cited

U.S. PATENT DOCUMENTS

| | | | |
|---|---|---|---|
| 5,151,988 | 9/1992 | Yamagishi | 395/600 |
| 5,490,060 | 2/1996 | Malec et al. | 364/401 |
| 5,553,279 | 9/1996 | Goldring | 395/600 |

OTHER PUBLICATIONS

Agrawal et al., "Mining Association Rules between Sets of Items in Large Databases", Proceedings of the 1993 ACM SIGMOD Conference, May 1993.

R. Agrawal et al., "Mining Association Rules Between Sets of Items in Large Databases", PROC. 1993 ACM SIGMOD Conf., pp. 207–216, 1993.

R. Agrawal et al., "Fast Algorithms for Mining Association Rules", Proceedings of the 1994 VLDB Conference, pp. 487–499, 1994.

M. Houtsma et al., "Set–Oriented Mining for Association Rules in Relational Databases", Proc. 11th Conference on Data Engineering, pp. 25–33, 1995.

H. Mannila et al., "Improved Methods for Finding Association Rules", Pub. No. C–1993–65, 20 pages, Univ. Helsinki, 1993.

J.J. Bernardo et al., Sequencing Rules for Productivity Improvements, Pub. Decis. Sci., V. 22, #3, pp. 620–634, Jul.–Aug., 1991.

M.D. Merrill, et al., Instructional Transaction Shells: Responsibilities, Methods, and Parameters, Pub. Educ. Technol. V. 32, #2, pp. 5–25, Feb. 1992.

W.D. Hopkins, et al., "Sequential Pattern Recognition Machine", IBM TDB, vol. 16, No. 1, pp. 97–99, 6/73.

H. Manilla et al., "Dependency Interference", Proc. 13th VLDB Conf., pp. 155–158, Brighton, 1987.

O. Klaassen, "Modeling Data Base Reference Behavior", Computer Performance Evaluation, G. Balbo, et al, eds, pp. 47–60, 1992.

G. Piatetsky–Shapiro, "Discovery, Analysis, and Presentation of Strong Rules", Knowledge Discovery in Databases, G. Piatelsby–Shapiro et al., eds., pp. 231–248, Menlo Park, 1991.

H. Mannila et al., "Efficient Algorithms for Discovering Association Rules", 1994, pp. 181–192, *AAAI–94 Workshop on Knowledge Discovery in Databases*.

R. Agrawal et al., "Quest: A Project on Database Mining", 1994, p. 514, *Proceedings of the 1994 ACM SIGMOD International Conference on Management of Data*.

*Primary Examiner*—Edward R. Cosimano
*Assistant Examiner*—Barton L. Bainbridge
*Attorney, Agent, or Firm*—Gray Cary Ware Freidenrich

[57] ABSTRACT

A system and method for discovering consumer purchasing tendencies includes a computer-implemented program which identifies consumer transaction itemsets that are stored in a database and which appear in the database a user-defined minimum number of times, referred to as minimum support. Then, the system discovers association rules in the itemsets by comparing the ratio of the number of times each of the large itemsets appears in the database to the number of times particular subsets of the itemset appear in the database. When the ratio exceeds a predetermined minimum confidence value, the system outputs an association rule which is representative of purchasing tendencies of consumers.

19 Claims, 7 Drawing Sheets

SYSTEM AND METHOD FOR QUICKLY MINING ASSOCIATION RULES IN DATABASES

CROSS REFERENCE TO RELATED APPLICATIONS

This application contains material related to the following co-pending U.S. Patent Applications, which are commonly assigned with this application.

U.S. patent application Ser. No. 08/227,428, now U.S. Pat. No. 5,664,171, filed Apr. 14, 1994, for "SYSTEM AND METHOD FOR QUERY OPTIMIZATION USING QUANTILE VALUES OF A LARGE UNORDERED DATA SET"; and U.S. patent application Ser. No. 08/398,640, filed Mar. 3, 1995, now abandoned, for "SYSTEM AND METHOD FOR MINING SEQUENTIAL PATTERNS IN A LARGE DATABASE".

The above-referenced U.S. patent application Ser. No. 08/398,640, is incorporated herein by reference.

BACKGROUND OF THE INVENTION

1. Field of the Invention

The present invention relates generally to data processing, and more particularly to "computer database mining" in which significant sequential patterns of transactions are discovered. In particular, the invention concerns quickly mining a large database of sales transactions.

2. Description of the Related Art

Customer purchasing patterns over time can provide invaluable marketing information for a wide variety of applications. For example, retailers can create more effective store displays and more effectively control inventory than otherwise would be possible if they know that, given a consumer's purchase of a first set of items, the same consumer can be expected, with some degree of probability, to purchase a particular second set of items along with the first set. In other words, it would be helpful from a marketing standpoint to know association rules between itemsets in a transaction. To illustrate, it would be helpful for a retailer of automotive parts and supplies to be aware of an association rule expressing the fact that 90% of the consumers who purchase automobile batteries and battery cables also purchase battery post brushes and battery post cleanser (referred to as the "consequent" in the terminology of the present invention).

It will be appreciated that advertisers too can benefit from a thorough knowledge of such consumer purchasing tendencies. Still further, catalogue companies can conduct more effective mass mailings if they know the tendencies of consumers to purchase particular sets of items with other sets of items. It is to be understood, however, that although this discussion focusses on the marketing applications of the present invention, database mining and, hence, the principles of the present invention, are useful in many other areas, e.g., business and science.

It happens that until recently, building large, detailed databases that could chronicle thousands, and from a statistical view preferably millions, of consumer transactions, much less deriving useful information from the databases (i.e., mining the databases), was highly impractical. Consequently, marketing and advertising strategies have been based upon anecdotal evidence of purchasing patterns, if any at all, and thus have been susceptible to inefficiencies in consumer targeting that have been difficult if not impossible to overcome.

With the advent of modern technology, however, building large databases of consumer transactions has become possible. The ubiquitous bar-code reader can almost instantaneously read so-called basket data, i.e., when a particular item from a particular lot was purchased by a consumer, how many items the consumer purchased, and so on, for automatic electronic storage of the basket data. Further, when the purchase is made with, for example, a credit card, the identity of the purchaser can be almost instantaneously known, recorded, and stored along with the basket data. Still further, vastly improved data storage media have made it possible to electronically store vast amounts of such information for future use.

As alluded to above, however, building a transaction database is only part of the marketing challenge. Another important part is the mining of the database for useful information. Such database mining becomes increasingly problematic as the size of databases expands into the gigabyte and indeed the terabyte range.

Not surprisingly, purchasing tendencies, and, hence, particular regimes of database mining, can be classified many ways. Of importance to the present invention is the customer purchasing tendencies during a single transaction. Stated differently, the present invention is focussed on discovering association rules within itemsets (non-empty sets) of consumer transactions.

Methods for mining transaction databases to discover association rules have been disclosed in Agrawal et al., "Mining Association Rules Between Sets of Items in Large Databases", *Proc. of the ACM SigMod Conf. on Management of Data*, May 1993, pp. 207–216, and in Houtsma et al., "Set-Oriented Mining of Association Rules", *IBM Research Report RJ 9567*, October, 1993. Unfortunately, these prior methods each have one or more drawbacks, including requiring excessive memory and requiring multiple data sorts and/or passes attributable to generating candidate itemsets of interest on-the-fly, that is during a pass over the data, which results in unduly prolonged processing time. Further, prior methods have not specifically addressed database structure or buffer management problems. Moreover, prior methods are incapable of discovering association rules having more than a single item in the consequent (the right-hand side of a rule), and accordingly are limited in their ability to discover useful association rules.

Accordingly, it is an object of the present invention to provide a system and method for quickly mining large databases. Another object of the present invention is to provide a system and method for discovering association rules in itemsets that are stored in a transaction database. Still another object of the present invention is to provide a system and method for rapidly finding association rules in itemsets which repeat with a user-defined degree of regularity, and which satisfy a user-defined degree of confidence. Yet another object of the present invention is to provide a system and method for quickly mining large databases which is easy to use and cost-effective.

SUMMARY OF THE INVENTION

The invention is an article of manufacture—a machine component—that is used by a digital processing apparatus and which tangibly embodies a program of instructions that are executable by the digital processing apparatus to identify association rules in itemsets in transactions which are stored in a large database.

This invention is realized in a critical machine component that causes a digital processing apparatus to perform method steps for identifying association rules in itemsets in transactions which are stored in a large database. Hereinafter, the machine component is referred to as a "computer program product".

In accordance with the present invention, the method steps include entering an itemset into a set of large itemsets when the number of times the itemset is present in the database exceeds a predefined minimum support value. Itemsets in the set of large itemsets are then concatenated in accordance with a predetermined concatenation regime to generate a next set of candidate large itemsets, and each itemset in the next set of candidate large itemsets is compared to the itemsets in the database to determine the number of times the candidate large itemset is present in the database. Next, a candidate large itemset is entered into a next forward set of large itemsets only when the number of times the candidate large itemset is present in the database is greater than the minimum support value.

For at least some of the itemsets in the next forward set of large itemsets, the number of times selected subsets of the itemsets appear in the database is determined. Per the invention, an association rule is output when the ratio of the number of times a selected subset appears in the database to the number of times the associated itemset appears in the database exceeds a predetermined minimum confidence value, thereby satisfying a minimum confidence constraint.

Preferably, the selected steps are iteratively repeated, and each itemset in the next set of candidate large itemsets is compared either to the itemsets in the database or to a previous set of candidate large itemsets. In one intended embodiment, each transaction is characterized by a unique transaction identifier, and candidate large itemsets in the next set of candidate large itemsets are associated with one of the transaction identifiers.

In a preferred embodiment, in a first iteration the selected subsets of the itemsets in the next forward set of large itemsets each contain one item. Then, in a second iteration the selected subsets are supersets only of those subsets found in the first iteration to have satisfied the minimum confidence constraint.

In another aspect of the present invention, a method of operating a computer system including the above-described program product device is disclosed.

In still another aspect of the present invention, a computer program product is disclosed which is readable by a digital processing apparatus and which tangibly embodies a computer program. The computer program product combines a computer readable medium with program code elements that identify association rules of itemsets stored in a database and having more than one item so as to discover customer purchasing tendencies.

In this invention, the code elements are embodied in a program stored on the computer readable medium. These code elements identify large itemsets in the database as those itemsets recurring with at least a user-defined minimum support. Also, the code elements discover association rules between the large itemsets and subsets thereof when the ratio of subset recurrence to itemset recurrence at least equals a user-defined confidence. Then, the code elements output the association rules as representative of customer purchasing tendencies.

In yet another aspect of the present invention, a database mining system is disclosed for discovering association rules in itemsets stored in a database. The system includes means for entering an itemset into a set of large itemsets when the number of times the itemset is present in the database exceeds a predefined minimum support value, and means for concatenating itemsets in the set of large itemsets in accordance with a predetermined concatenation regime to generate a next set of candidate large itemsets.

Moreover, the system includes means for comparing each itemset in the next set of candidate large itemsets to the itemsets in the database to determine the number of times the candidate large itemset is present in the database. Additionally, the system includes means for entering a candidate large itemset into a next forward set of large itemsets when the number of times the candidate large itemset is present in the database is greater than the minimum support value.

Furthermore, the system includes means for entering at least some of the itemsets in the next forward set of large itemsets, and for determining the number of times selected subsets of the itemsets appear in the database. Means are also provided for outputting an association rule when the ratio of the number of times a selected subset appears in the database to the number of times the associated itemset appears in the database exceeds a predetermined minimum confidence value and thereby satisfies a minimum confidence constraint.

In another aspect of the present invention, a computer-based system is disclosed for discovering purchasing tendencies of consumers by identifying association rules between itemsets of transactions and subsets of the itemsets, wherein the subsets include one or more items. In accordance with the present invention, the system includes a multi-level hash tree data structure which is accessible by the computer for electronically storing the itemsets. Also, the system includes a large itemset generator for accessing the database to determine a first number of times an itemset appears in the database and to designate the itemset as a large itemset when the first number of times exceeds a minimum support value.

The system is further characterized by an association rule discoverer which accesses the large itemset generator for determining a second number of times at least one subset of an itemset appears in the database. As intended by the present invention, the association rule discoverer outputs an association rule that is representative of purchasing tendencies of consumers when the ratio of the first number of times to the second number of times equals a predetermined minimum confidence value.

The details of the present invention, both as to its structure and operation, can best be understood in reference to the accompanying drawings, in which like reference numerals refer to like parts, and in which:

BRIEF DESCRIPTION OF THE PREFERRED EMBODIMENTS

DETAILED DESCRIPTION OF THE PREFERRED EMBODIMENTS

Figure 1:
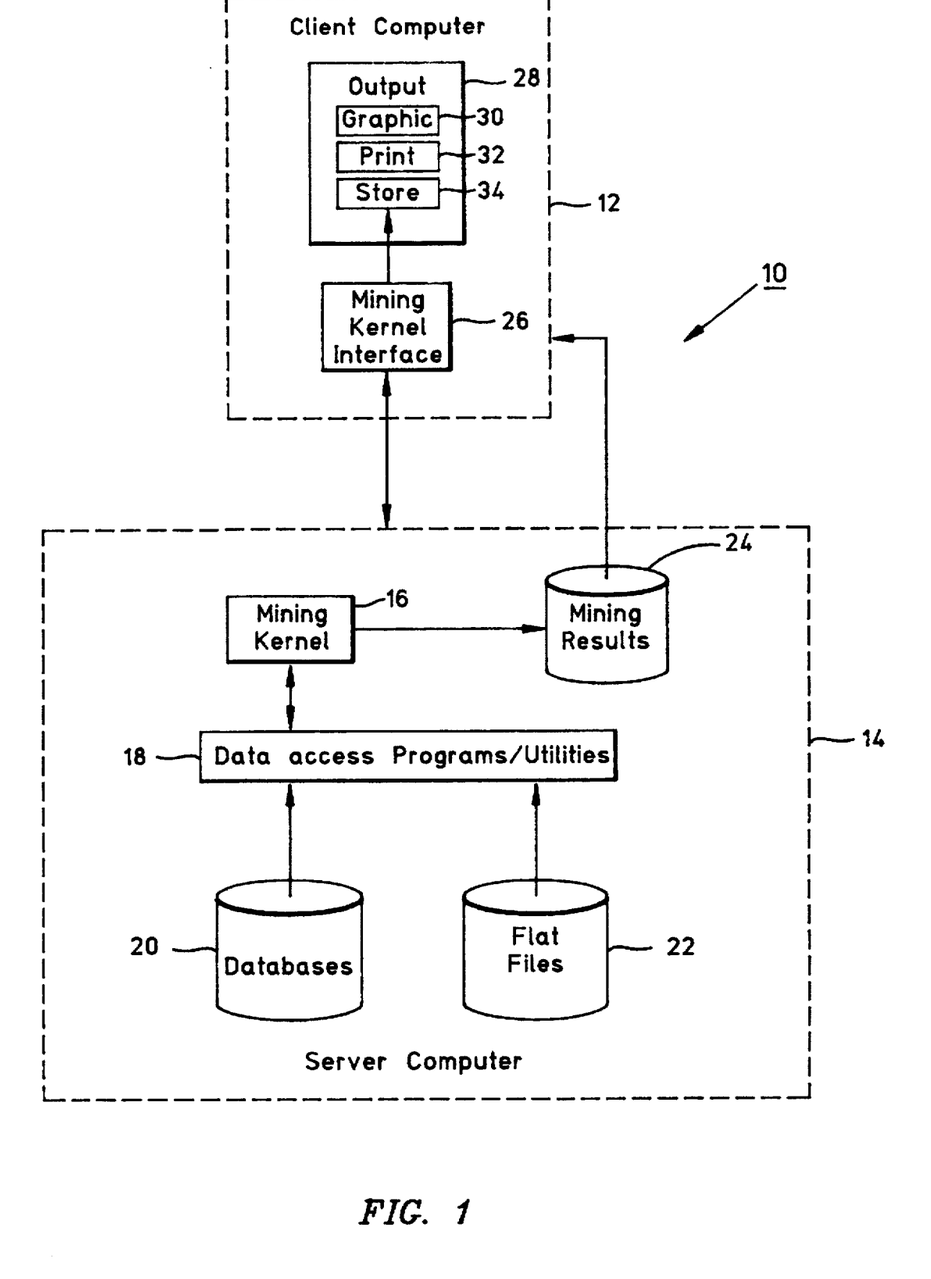
FIG. 1 is a functional block diagram of the system for mining association rules of the present invention.

Referring initially to FIG. 1, a system for mining databases for association rules is shown, generally designated 10. In the particular architecture shown, the system 10 includes one or more digital processing apparatus, such as a client computer 12 and a server computer 14. In one intended embodiment, the server computer 14 may be a mainframe computer made by IBM Corp. of Armonk, N.Y., and use an operating system sold under trademarks such as MVS. Or, the server computer 14 may be a Unix computer, or OS/2 server, or Windows NT server. The server computer 14 may own a database system, such as DB2 or ORACLE, or it may have data on files on some data storage medium such as disk or tape.

As shown, the server computer 14 includes a mining kernel 16 which may be executed by a processor within the server computer 14 as a series of computer-executable instructions. These instructions may reside, for example, in RAM of the computer 14.

Alternatively, the instructions may be contained on a data storage device with a computer readable medium, such as a computer diskette. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled $C^{++}$ language code. It is to be understood that architectures other than the one shown may be used. For example, the functions of the client computer 12 may be incorporated into the server computer 14, and vice versa. FIGS. 2–8 and 10–12 illustrate, in the form of a flow chart, the structure of such a computer program.

FIG. 1 shows that, through appropriate data access programs and utilities 18, the mining kernel 16 accesses one or more databases 20 and/or flat files (i.e., text files) 22 which contain data chronicling transactions. After executing the steps described below, the mining kernel outputs association rules it discovers to a mining results repository 24, which can be accessed by the client computer 12. Preferably, the database 20 is accessed by a dynamic multi-level hash data structure, as more fully discussed below.

Additionally, FIG. 1 shows that the client computer 12 can include a mining kernel interface 26 which, like the mining kernel 16, may be implemented in suitable computer code. Among other things, the interface 26 functions as an input mechanism for establishing certain variables, including the minimum support value and minimum confidence value defined below. Further, the client computer 12 preferably includes an output module 28 for outputting/displaying the mining results on a graphic display 30, print mechanism 32, or data storage medium 34.

Figures 2, 3:
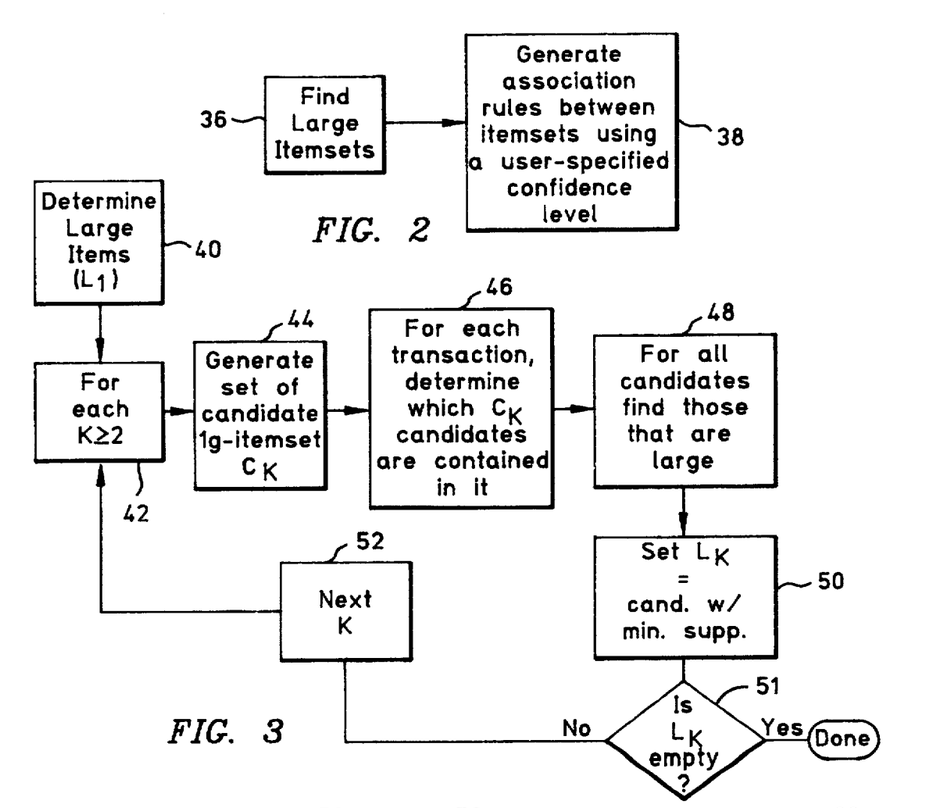
FIG. 2 is a flow chart showing the overall operation of the present invention.
FIG. 3 is a flow chart showing the operation of the Apriori embodiment of the present invention in identifying large itemsets.

FIG. 2 shows the overall method of the present invention. Beginning with block 36, the system 10 identifies large itemsets in the database 20. Thus, block 36 is essentially a large itemset generator. As more fully disclosed below, by "large itemset" is meant a set of one or more items which are purchased in a user-defined percentage of all transactions in the database 20, i.e., itemsets which are appear in the database 20 in a user-defined "minimum support" percentage of transactions. Stated differently, at block 36 the database 20 is accessed for determining a first number of times an itemset appears in the database and for designating the itemset as a large itemset when the first number of times exceeds a minimum support value.

After the large itemsets have been identified at block 36, the process moves to block 38. In accordance with the invention disclosed in detail below, block 38 is an association rule discoverer which accesses the large itemset generator established by block 36 for determining a second number of times at least one subset of an itemset appears in the database 20. Then, the association rule discoverer at block 38 outputs an association rule representative of purchasing tendencies of consumers when the ratio of the first number of times to the second number of times equals a predetermined or user specified minimum confidence value.

As an example, the present invention might access a database which chronicles transactions in an automobile parts, supplies, and service center. An association rule that can be discovered by the present invention might be that 98% of all customers who purchase tires along with tire pressure gages also purchase wheel balancing services during the transaction. Stated differently, in the example given it can be said with a 98% confidence level that wheel balancing services are not purchased separately from tires and tire pressure gages. As recognized by the present invention, the implications of association rules which are discovered between itemsets can produce substantial economic value to retailers, advertisers, marketing executives, and indeed in a wide variety of applications.

FIG. 3 shows one embodiment of the process of the large itemset generator established by block 36 in FIG. 2, referred to herein as "Apriori". The processing structure shown in FIG. 3 is referred to as "Apriori" because, in contrast to the prior procedures mentioned above, the present invention determines Apriori which candidate large sequences are to be counted. In contrast to the present invention, the prior procedures mentioned above generate and count candidate large sequences "on the fly", i.e., during a pass over the database, which can undesirably lead to the generation and processing of an excessive number of candidates that turn out to be small.

Recall that "large itemsets" means itemsets which appear in the database with a userdefined regularity, termed herein as "minimum support". For example, the user may want to know what itemsets appear in at least 25% of the customer transactions in the database. The minimum support value in this instance is 25%, and by counting the number of transactions in which the itemset appears and then dividing by the total number of transactions, it may be determined whether the itemset meets the minimum support criterion.

At block 40, the mining kernel 16 embodied by the mining kernel 16 embodied by the system 10 identifies the set $L_1$ of large single-item itemsets in the database 20. To determine whether a single item itemset is large, all items in the database 20 are initially counted by passing over the database 20, and their support determined as described above. The following publications, all of which are incorporated herein by reference, disclose specific methods for finding large itemsets: Agrawal et al., "Mining Association Rules Between Sets of Items in Large Databases", *Proc. of the ACM SigMod Conference on Management of Data*, Washington, D.C. 1993; Agrawal et al., "Fast Algorithms for Mining Association Rules in Large Databases", *Proc. of the VLDB Conference*, Santiago, Chile 1994; Houtsma et al., "Set-Oriented Mining of Association Rules", *IBM Research Report RJ* 9567, October, 1993; and Mannila et al., "Efficient Algorithms for Discovering Association Rules", *KDD-94:AAAI Workshop on Knowledge Discovery in Databases*, July 1994.

Next, at block 42, the mining kernel 16 embodied by the system 10 enters an iterative process for each $k \geq 2$. At block 44, as disclosed in greater detail below in reference to FIG. 4, a seed set of large itemsets $L_{k-1}$ having a length (i.e., number of itemsets) equal to "k−1" (initially consisting of the set of large itemsets disclosed above, wherein k=2) is used for generating a set of candidate large itemsets $C_k$ having length k.

Then, as more fully disclosed below in reference to FIG. 6, at block 46 for each transaction in the database the method determines which candidate large itemsets in the set $C_k$ of candidate large itemsets are contained in the transaction. At block 48, the support for the candidate large itemsets is determined by passing over the database to count the number of times each candidate large itemset appears therein, and then determining whether the number of times equals the minimum support value defined by the user.

At block 50, a forward set $L_k$ of actual large itemsets is set equal to the set of candidate large itemsets found at block 48 to have minimum support. This forward set $L_k$ of actual large itemsets becomes the seed for the next iteration at block 52. From block 52, the mining kernel 16 embodied by the system 10 returns to block 42. When $L_k$ is empty, the process terminates. This decision is shown in block 51.

Figure 4:
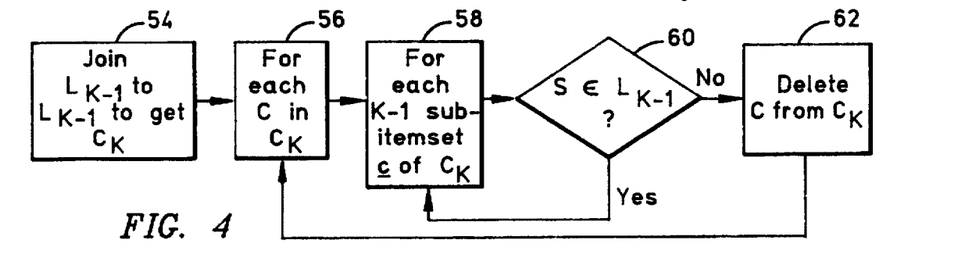
FIG. 4 is a flow chart showing the candidate generation of the present invention.

FIG. 4 shows the details of the Apriori embodiment in creating sets of candidate large itemsets. At block 54, $L_{k-1}$ is concatenated (i.e., joined) to itself to create an initial $C_k$ having c itemsets. More particularly, the itemsets, designated as $p.litemset_1, p.litemset_2, \ldots p.litemset_{k-1}$ of $L_{k-1}$ are joined to each of the other itemsets, designated $q.litemset_1, q.litemset_2, \ldots q.litemset_{k-1}$ in $L_{k-1}$ to yield a set $C_k$ of candidate large itemsets c, each c having k itemsets, with the constraint that no itemset c in $C_k$ is repeated.

Next, the mining kernel 16 embodied by the system 10 prunes candidate itemsets c from $C_k$ which contain any subitemsets not found in $L_{k-1}$. The mining kernel 16 embodied by the system 10 considers, at block 56, each customer itemset c in the set of candidate large itemsets $C_k$ as described below, and then proceeds to block 58 for each subitemset s having k−1 itemsets of the candidate set of large itemsets $C_k$.

Starting with the initial candidate itemset c in the set of candidate large itemsets $C_k$, and with the initial subitemset s of $C_k$ having k−1 itemsets at decision block 60, the mining kernel 16 embodied by the system 10 determines whether s is an element of the immediately preceding set of actual large itemsets $L_{k-1}$. As intended by the present invention, the set of large itemsets is used as the seed for the first iteration.

If s is an element of the immediately preceding set of actual large itemsets $L_{k-1}$, the mining kernel 16 embodied by the system 10 moves back to block 58 to retrieve the next subitemset s in $C_k$. Otherwise, the mining kernel 16 embodied by the system 10 proceeds to block 62 to delete, i.e., prune, c from $C_k$, and then the mining kernel 16 embodied by the system 10 returns to block 56 to test the next itemset c in $C_k$. As intended by the present invention, the immediately preceding set $C_{k-1}$ of candidate large itemsets may be used in lieu of the immediately preceding set of actual large itemsets $L_{k-1}$ to generate the set $C_k$ of candidate large itemsets.

Figure 5:
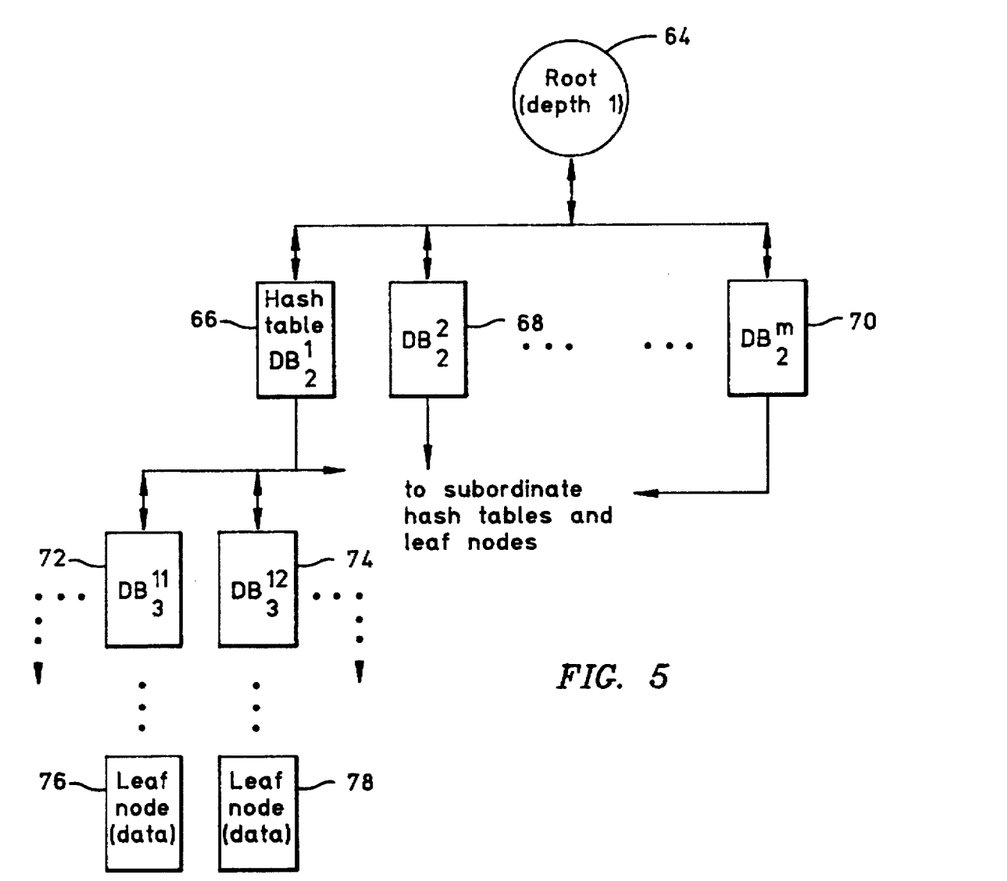
FIG. 5 is a schematic diagram showing the data structure used by the Apriori embodiment.

In very large databases, e.g., databases in the gigabyte and indeed terabyte range, database management and data buffer management can present challenges. FIGS. 5 and 6 how the Apriori embodiment of the present invention addresses database management, and FIG. 7 shows how the Apriori embodiment of the present invention addresses data buffer management.

As can be appreciated in reference to FIG. 5, data in the present invention, for example, data contained in a set $C_k$ of candidate large itemsets, is preferably arranged in a data structure organized to permit rapid searching such as a dynamic hash-tree. Such a data structure includes a root 64 that is at a depth, i.e., data structure level, of unity. The hash tree then branches into a plurality of hash table nodes 66, 68, 70 at depth 2, herein designated $DB^1_2, DB^2_2 \ldots DB^m_2$, each of which hash table nodes 66, 68, 70 contains one or more so-called "buckets". Each bucket in one of the hash table nodes 66, 68, 70 points to a node at depth 3, e.g., one of the nodes 72, 74 designated $DB^{11}_3, DB^{12}_3$, and this branching to further hash table nodes to a depth "d" continues. Eventually, when the number of itemsets in a particular branch may be stored in a single bucket, the node becomes a so-called "leaf node", e.g, one of the leaf nodes 76, 78, which directly stores part of the transaction data.

To add an itemset c to the hash tree shown in FIG. 5, a hash function is applied to the $d^{th}$ item of the itemset c to thereby generate a path to follow down the hash tree. Initially, all nodes are created as leaf nodes, and when the number of itemsets stored in a leaf node exceeds a predetermined number, the leaf node is converted to a hash table node which points to a subordinate leaf node (or hash table node) in which further data may be stored.

Figure 6:
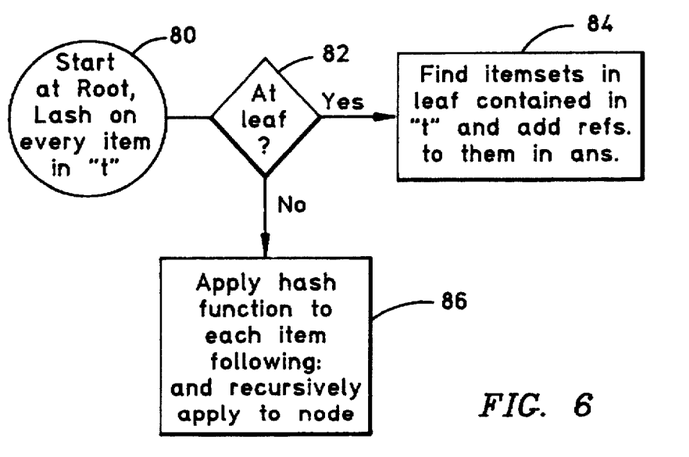
FIG. 6 is a flow chart showing the data management of the Apriori embodiment.
Figure 7:
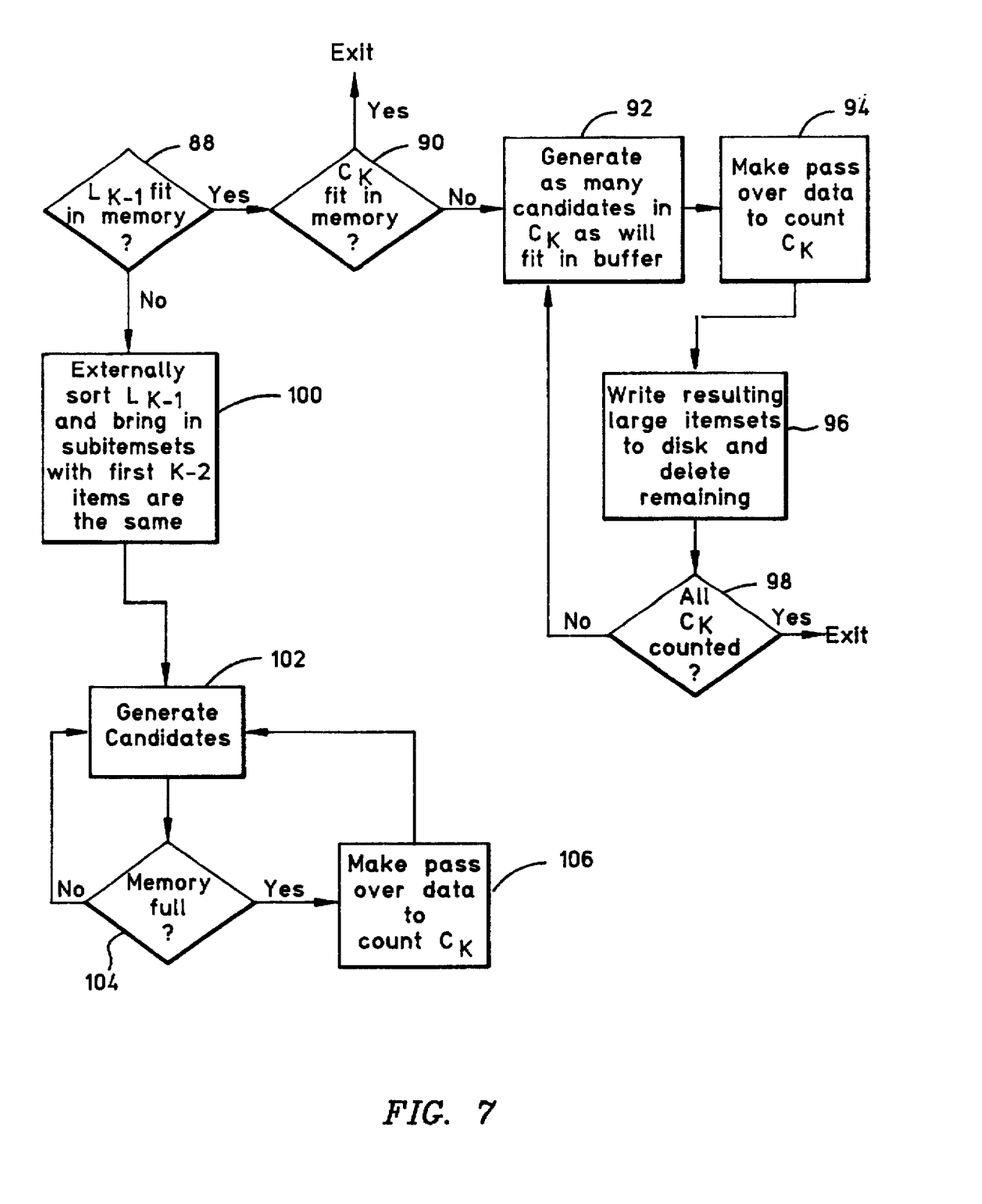
FIG. 7 is a flow chart showing the buffer management of the Apriori embodiment.

With the above in mind, FIG. 6 shows how the step at block 46 in FIG. 3 is accomplished. Starting at the root node 649 the mining kernel 16 embodied by the system 10 applies the hash function (also referred to as "hashes on") every item "i" in the transaction "t" under test. Moving to decision block 82, it is determined whether the process is examining a leaf node. If so, at block 84 the mining kernel 16 embodied by the system 10 identifies which itemsets in the leaf node are contained in the transaction "t" and then adds a reference to those itemsets to the answer set, formatted in the preferred embodiment as a bitmap. Otherwise, at block 86 the mining kernel 16 embodied by the system 10 applies the hash function to every itemset following the itemset "i" under test at block 86 and recursively applies the procedure to the node.

FIG. 7 shows the preferred method by which the Apriori embodiment undertakes data buffer management. Starting at decision block 88, the mining kernel 16 embodied by the system 10 determines whether the set $L_{k-1}$ of actual large itemsets fits into buffer memory. If it does, the mining kernel 16 embodied by the system 10 tests at decision block 90 whether the set $C_k$ of candidate large itemsets fits into buffer memory. If it does, buffer size is not limited and the mining kernel 16 embodied by the system 10 exits the process shown in FIG. 7.

On the other hand, if, at decision block 90, the system determined that the set $C_k$ of candidate large itemsets does not fit into buffer memory, the mining kernel 16 embodied by the system 10 generates as many candidates "c" in the set $C_k$ of candidate large itemsets that will fit into memory at block 92. Then, a pass is made over the data at block 94 to count the support for the set $C_k$ of candidate large itemsets, and the resulting set $L_k$ of actual large itemsets is written to disk at block 96, with the small candidate large itemsets "c" being deleted. At decision block 98, the mining kernel 16 embodied by the system 10 determines whether all candidate large itemsets "c" in the set $C_k$ of candidate large itemsets have been counted, and if so, exits FIG. 7. Otherwise, the mining kernel 16 embodied by the system 10 loops back to block 92.

If it is determined at decision block 88 that the set $L_{k-1}$ of actual large itemsets fails to fit into buffer memory, the mining kernel 16 embodied by the system 10 moves to block 100 to externally sort the set $L_{k-1}$ of actual large itemsets and bring into buffer memory subitemsets of the set $L_{k-1}$ in which the first k-2 items are the same. At block 102, candidate large itemsets "c" (i.e., the set $C_k$ of candidate large itemsets) are generated using these blocks of the set $L_{k-1}$ in accordance with the principles described above, until it is determined at decision block 104 that buffer memory has become full. If so, a pass is made over the database at block 106 to count the set $C_k$ of candidate large itemsets. The mining kernel 16 embodied by the system 10 then loops back to block 102. It will be appreciated that the pruning steps of FIG. 4 cannot be executed, because all of the set $L_{k-1}$ is not in buffer memory.

Figure 8:
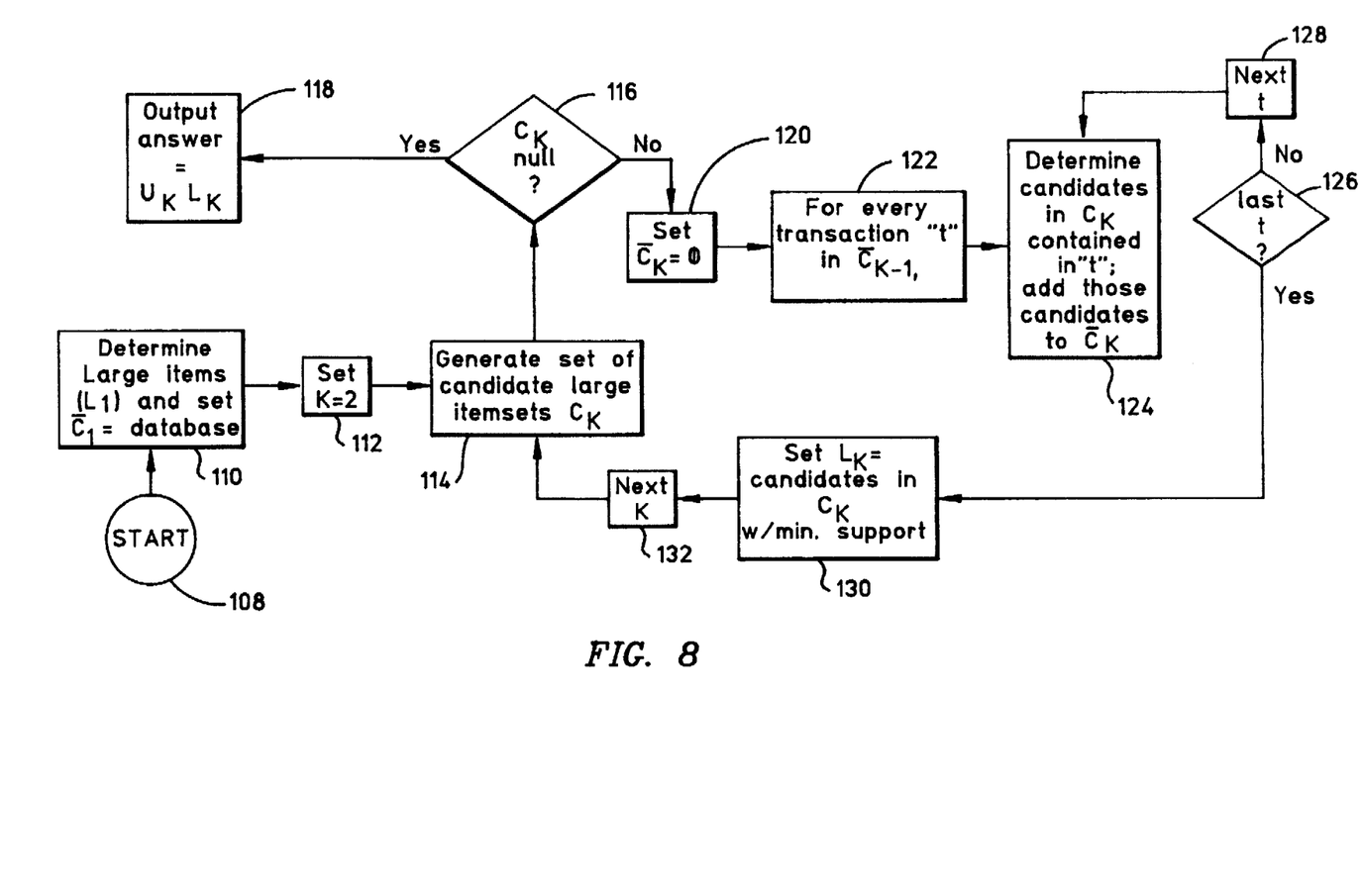
FIG. 8 is a flow chart showing the operation of the AprioriTid embodiment of the present invention in identifying large itemsets.

Turning now to FIG. 8, the operation and processing structure of the AprioriTid embodiment of the present invention can be seen. Like the Apriori embodiment disclosed above, the AprioriTid method generates successive sets of successively longer candidate large itemsets $C_k$. In contrast to the Apriori embodiment, however, the AprioriTid embodiment counts support for candidate large itemsets not by passing over the entire database 20 after the first iteration, but by examining a transformed set $\overline{C}_k$ of candidate large itemsets having a data format of <TID, $\{X_k\}$>, where TID is a transaction identifier and $\{X_k\}$ is a potentially large k-itemset contained in the transaction with identifier TID.

The AprioriTid embodiment begins at start circle 108 and proceeds to block 1109 wherein a transformed set $\overline{C}_1$ of candidate large itemsets is set equal to the database, and a set L, of large items is found in accordance with the principles disclosed below.

Next, at block 112, k is set equal to two (2), and then at block 114 a set $C_k$ of candidate large itemsets is generated by the concatenation regime shown in FIG. 4 above. From block 114, the mining kernel 16 determines whether the set $C_k$ of candidate large itemsets is null at decision block 116, and if so, outputs the answer at block 118 as being the union of sets $L_k$ of large itemsets.

Otherwise, the mining kernel 16 embodied in the system 10 sets a transformed set $\overline{C}_k$ of candidate large itemsets equal to null at block 120. Then, at block 122, the transactions "t" in the immediately preceding transformed set $\overline{C}_{k-1}$ of candidate large itemsets is selected and at block 124 it is determined, for this transaction "t", what candidate large itemsets in $C_k$ are contained in the transaction. The candidate large itemsets which are contained in the present transaction "t" under test are entered into a transaction set $C_t$, and the transformed set $\overline{C}_k$ of candidate large itemsets is set equal to the sum of all transaction sets $C_t$.

Next, at decision block 126, the mining kernel 16 determines whether the last transaction "t" in the immediately preceding transformed set $\overline{C}_{k-1}$ of candidate large itemsets has been tested, and if not, the mining kernel 16 retrieves the next transaction "t" at block 128 and then loops back to block 124. If the last transaction "t" has been tested, the mining kernel 16 compares the count of each candidate large itemset contained in the set $C_k$ of candidate large itemsets with the minimum support value at block 130, and sets a set $L_k$ of actual large itemsets equal to those candidates in the set $C_k$ of candidate large itemsets found to be large. From block 130, the mining kernel 16 proceeds to block 132 to retrieve the next k (i.e., to increment the value of k by one (1)), and then loops back to block 114.

Figure 9:
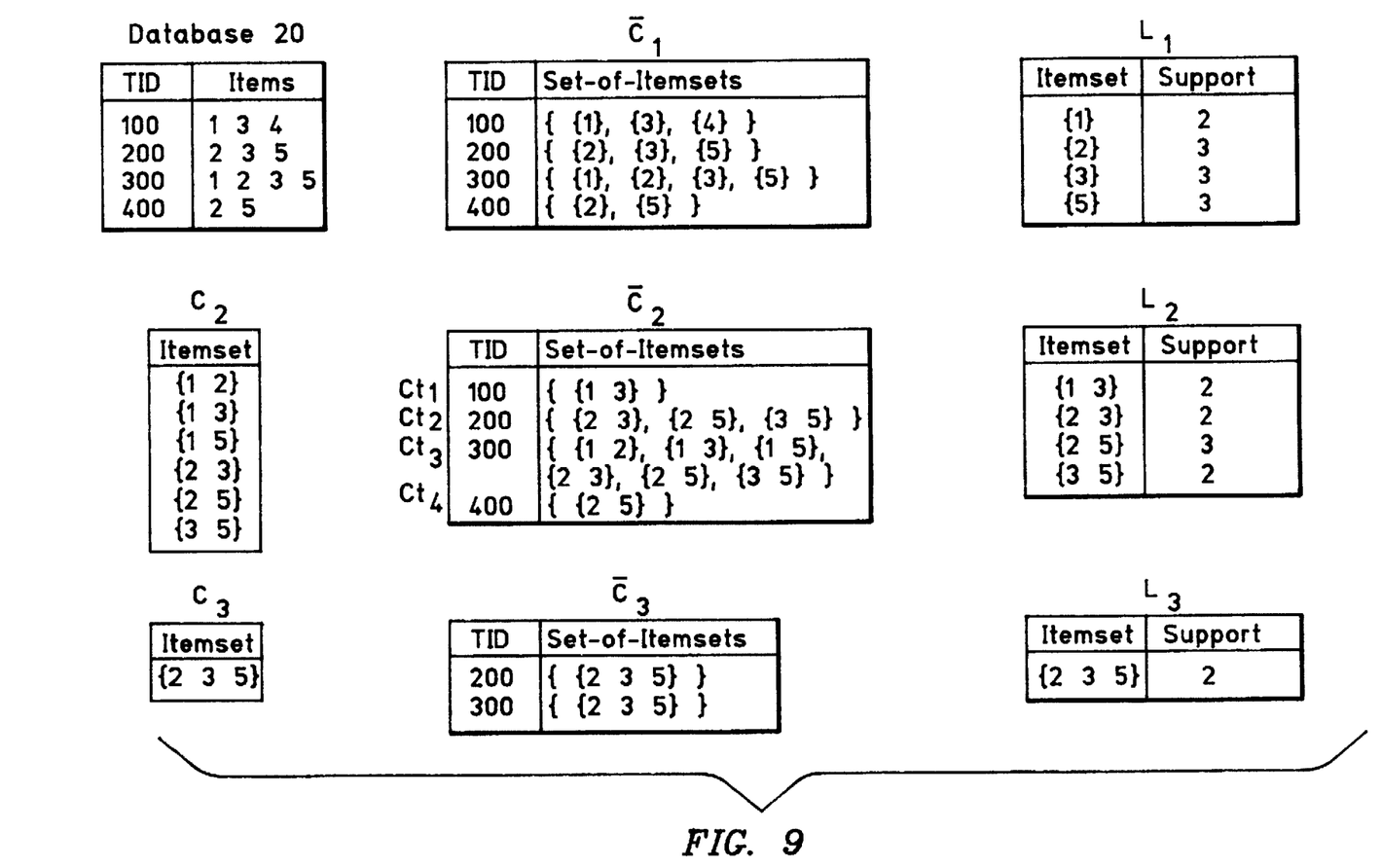
FIG. 9 is a schematic diagram showing the data structure used by the AprioriTid embodiment.

FIG. 9 provides one illustration of data structures that are used and processed by the AprioriTid embodiment of the invention just described. In understanding FIG. 9, it is assumed that the minimum support value has been established to be two (2). As shown in FIG. 9, contents of the database 20 initially are sorted by transaction identity (TID) and include items contained in each transaction. The first transformed set $\overline{C}_1$ of candidate large itemsets is then generated essentially as the database 20 with items of length one (1) therein separately listed with the corresponding TID. The first set $L_1$ of actual large itemsets is generated by passing over the database 20 to count the support of the candidate itemsets in the transformed set $\overline{C}_1$ of candidate large itemsets.

Next, the second set $C_2$ of candidate large itemsets is generated by concatenating the first set $L_1$ of actual large itemsets in accordance with the principles shown above in FIG. 4. Then, the second transformed set $C_2$ of candidate large itemsets is generated by the union of the individual transaction sets $C_t$.

It can be appreciated in reference to FIG. 9 that in generating each transaction set $C_t$ in the transformed set $\overline{C}_2$ of candidate large itemsets, both the immediately preceding transformed set $\overline{C}_1$ of candidate large itemsets and the current set $C_2$ of candidate large itemsets are accessed. As intended by the present invention, for a candidate large itemset "c" to be entered into the transformed set $\overline{C}_2$ of candidate large itemsets, the itemset "c" must satisfy the following conditions:

(1) The itemset "c" must appear in the current set $C_2$ of candidate large itemsets;

(2) both of the following subsets of the itemset "c" must appear in the corresponding immediately preceding transaction set $C_t$ in the immediately preceding transformed set $\overline{C}_{k-1}$:

c—c[k]; and c—c[k−1].

Accordingly, as seen in FIG. 9, the first entry in the transformed set $\overline{C}_2$ is the candidate itemset {1 3} because {1 3} appears in the set $C_2$ and both ({1 3}-{1}) and ({1 3}-{3}) are members of the corresponding transaction set in the immediately preceding transformed set $\overline{C}_1$.

After $C_2$ is generated, $L_2$ is generated as discussed above by counting the support for the candidate large itemsets in $C_2$. It will be appreciated by the skilled artisan that in counting the support for the candidate large itemsets in $C_2$, no pass over the database 20 is necessary. Instead, the transformed set $\overline{C}_2$ is examined, and the number of transactions in which any given candidate large itemset appears is equal to the count for that candidate large itemset. The counts of the individual candidate large itemsets are then simply compared to the minimum support value to determine whether the itemset is actually large, and if it is, it is entered into $L_2$.

The invention shown in FIG. 4 is next used to generate $C_3$, with $\overline{C}_3$ and $L_3$ being generated using the principles discussed above. In the preferred embodiment for determining whether condition (2) above is satisfied, each candidate large itemset $c_k$ is assigned a unique ID number which can indicate the IDs of both, but preferably only the second, of the two large k-1 itemsets were joined to create $c_k$, and which also indicates the IDs of the k+1 candidates that are extensions of $c_k$.

As recognized by the present invention, in some applications it may be advantageous to use both the Apriori and AprioriTid large itemset generators disclosed above. Such a hybrid large itemset generator would begin to generate large itemsets using the Apriori embodiment when the value of k is relatively small, and then switch to the AprioriTid embodiment when the value of k is relatively large. Such a switch may advantageously be made when it is estimated that the transformed set $\overline{C}_k$' will fit into memory, provided that fewer candidate large itemsets were generated in the current $k^{th}$ pass than in the immediately preceding k-1 pass. In the presently preferred embodiment, the estimation is made by calculating the combined size of all candidates in $C_k$ having minimum support, plus the number of transactions in the database 20.

Figures 10, 11:
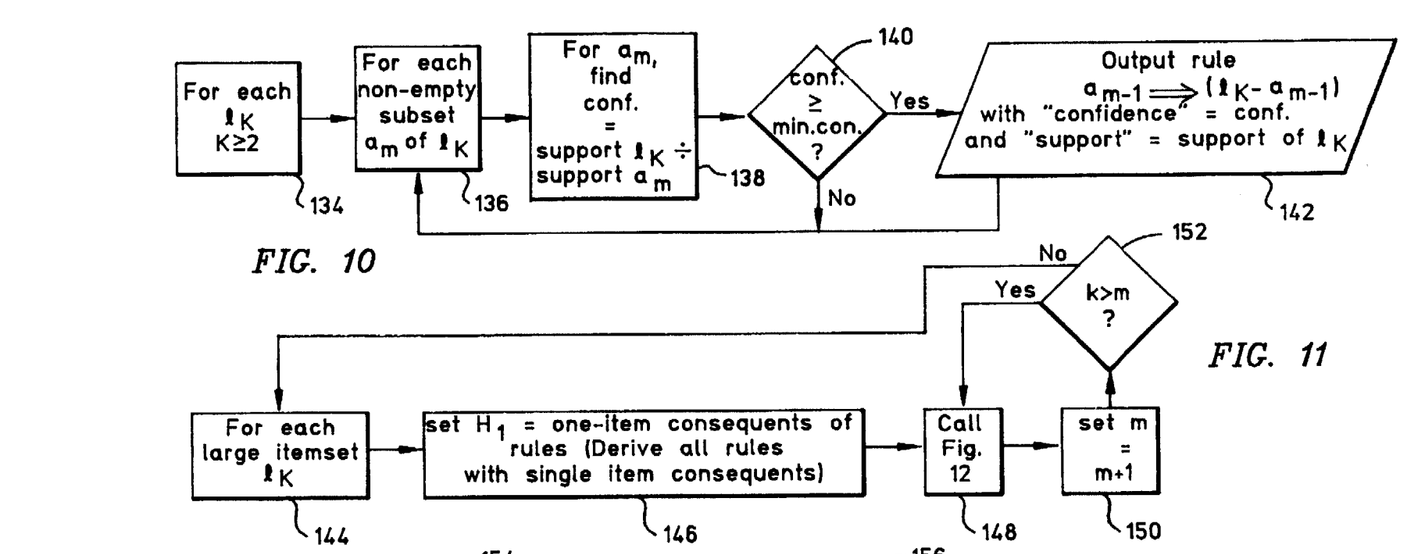
FIG. 10 is a flow chart showing a simple method for determining association rules in large itemsets.
FIG. 11 is a flow chart showing a comparatively fast method for determining association rules in large itemsets.

Turning now to FIG. 10, one embodiment of the association rule discoverer of the present invention is shown. It is to be understood that FIG. 10 is entered by the mining kernel 16 after all large itemsets in the database 20 have been identified using the Apriori or AprioriTid large itemset generator disclosed above. Stated differently, FIG. 10 is entered with all itemsets found by the large itemset generator to have a support value in the database 20 which exceeds the user-defined minimum support value.

As indicated at block 134, the mining kernel 16 undertakes the operations shown in FIG. 10 for each large itemset $1_k$, k≧2, and proceeds to block 136, wherein the mining kernel 16 selects the next non-empty subset $a_m$ of the large itemset $1_k$ under test. At block 138, for the subset $a_m$ under test, the mining kernel 16 calculates a confidence value to be the support of the large itemset $1_k$ under test divided by the support of the subset $a_m$ under test. Then, at decision block 140, the mining kernel 16 compares the confidence value of the subset $a_m$ to a user-defined minimum confidence value, and if the confidence value of the subset $a_m$ is not at least equal to the user-defined minimum confidence value, the mining kernel 16 loops back to block 136 to retrieve the next subset $a_{m+1}$ of the large itemset $1_k$ under test.

On the other hand, if, at decision block 140, the mining kernel 16 determines that the confidence value of the subset $a_m$ is at least equal to the user-defined minimum confidence value, the mining kernel 16 proceeds to output block 142 to output an association rule of the form $$a_{m-1} \rightarrow (1_k - a_{m-1})$$

with "confidence=[calculated confidence value]," support= [support of $1_k$], and the term on the right side of the implication arrow is referred to as the "consequent" of the rule. From output block 142, the mining kernel 16 loops back to block 136 to retrieve the next subset $a_{m+1}$ of the large itemset $1_k$ under test.

Figure 12:
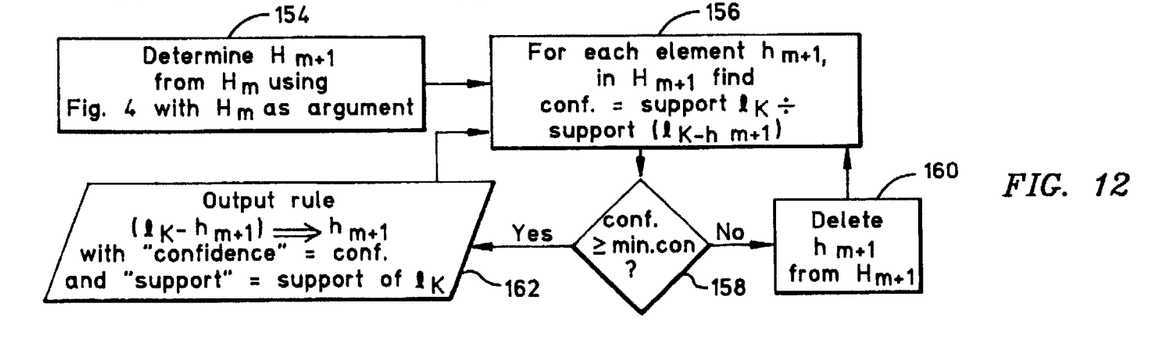
FIG. 12 is a flow chart showing the details of the method shown in FIG. 7.

FIGS. 11 and 12 show a faster embodiment for discovering association rules. As indicated at block 144, the mining kernel 16 undertakes the operations shown in FIG. 11 for each large itemset $1_k$, and proceeds to block 146, wherein the mining kernel 16 sets an initial consequent set $H_1$=all one item consequents of association rules derived essentially using the embodiment shown in FIG. 10. FIG. 12 is called at block 148 to determine association rules having more than a one item consequent, and then the value of m is incremented by one at block 150. At block 152, it is determined whether k is greater than the new value of m, and if it is, the mining kernel 16 loops back to block 148. Otherwise, the mining kernel 16 loops back to block 144 to retrieve the next large itemset.

Now referring to FIG. 12, the details of the faster embodiment for discovering association rules can be seen. Beginning at block 154, a next consequent set $H_{m+1}$ is generated from the consequent set $H_m$ using the invention shown in FIG. 4, with the consequent set $H_m$ as the entering argument. Proceeding to block 156, for each element $h_{m+1}$ the next consequent set $H_{m+1}$ under test, the mining kernel 16 calculates a confidence value to be the support of the large itemset $1_k$ under test divided by the support of the subset $(1_{k-h_{m+1}})$. Then, at decision block 158, the mining kernel 16 compares the confidence value determined at block 156 to a user-defined minimum confidence value, and if the confidence value is not at least equal to the user-defined minimum confidence value, the mining kernel 16 deletes the element $h_{m+1}$ from the next consequent set $H_{m+1}$ at block 160.

On the other hand, if, at decision block 158, the mining kernel 16 determines that the confidence value determined at block 156 is at least equal to the user-defined minimum confidence value, the mining kernel 16 proceeds to output block 162 to output an association rule of the form $$(1_k - h_{m+1}) \rightarrow h_{m+1})$$

with "confidence=[calculated confidence value]," support= [support of $1_k$]. From either output block 162 or block 160, the mining kernel 16 loops back to block 156 to retrieve the next element $h_{m+1}$ from the next consequent set $H_{m+1}$.

Figure 13:
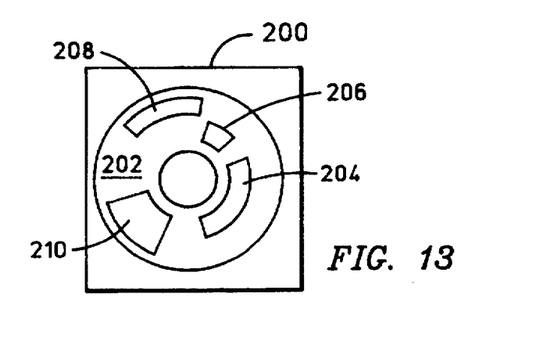
FIG. 13 illustrates a machine component embodying the invention.

Those skilled in the art will appreciate that FIGS. 2–12 illustrate the structures of computer program code elements that function according to this invention. Manifestly, the invention is practiced in its essential embodiment by a machine component that renders the computer program code elements in a form that causes a digital processing apparatus (that is, a computer) to perform a sequence of function steps corresponding to those shown in the Figures. The machine component is shown in FIG. 13 as a combination of program code elements 204, 206, 208 and 210 in computer readable form that are embodied in a computer usable data medium 202, on a floppy disk 200. As is known, such media can also be found in semiconductor devices, on magnetic tape, and on optical disks.

While the particular system and method for mining association rules in databases as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A method executable by a computer having a computer program storage device readable by the computer and a program means on the program storage device and including instructions executable by the computer for performing method steps identifying association rules in itemsets in transactions which are stored in a database, each itemset characterized by one or more items, the method comprising:

entering an itemset into a set of large itemsets when the number of times the itemset is present in the database exceeds a predefined minimum support value;

concatenating itemsets in the set of large itemsets in accordance with a predetermined concatenation regime to generate a next set of candidate large itemsets and discarding all candidate large itemsets whose subsets are not large itemsets;

comparing each itemset in the next set of candidate large itemsets to the itemsets in the database to determine the number of times the candidate large itemset is present in the database;

entering a candidate large itemset into a next forward set of large itemsets only when the number of times the candidate large itemset is present in the database is greater than the minimum support value;

for at least some of the itemsets in the next forward set of large itemsets, determining the number of times selected subsets of the itemsets appear in the database; and outputting an association rule when the ratio of the number of times a selected subset having a plurality of items appears in the database to the number of times the associated itemset appears in the database exceeds a predetermined minimum confidence value and thereby satisfies a minimum confidence constraint.

2. The method of claim 1, wherein the method iteratively repeats selected steps, and each itemset in the next set of candidate large itemsets is compared either to the itemsets in the database or to a previous set of candidate large itemsets.

3. The method of claim 1, wherein each transaction is characterized by a unique transaction identifier, and candidate large itemsets in the next set of candidate large itemsets are associated with one of the transaction identifiers.

4. The method of claim 1, wherein determining and outputting are iteratively repeated, and in a first iteration the selected subsets of the itemsets in the next forward set of large itemsets each contain one item.

5. The method of claim 4, wherein in a first iteration the selected subsets each contain one item, and in a second iteration the selected subsets are supersets only of those subsets found in the first iteration to have satisfied the minimum confidence constraint.

6. A computer program product for use with a computer system, a central processing unit and means coupled to the central processing unit for storing a database to identify association rules in itemsets in transactions which are stored in the database, each itemset characterized by one or more items, comprising:

a data storage device including a computer usable medium having computer readable program means for identifying association rules in itemsets in transactions which are stored in a database, the computer usable code means having:

computer readable code means for entering an itemset into a set of large itemsets when the number of times the itemset is present in the database exceeds a predefined minimum support value;

computer readable code means for concatenating itemsets in the set of large itemsets in accordance with a predetermined concatenation regime to generate a next set of candidate large itemsets;

computer readable code means for comparing each itemset in the next set of candidate large itemsets to the itemsets in the database to determine the number of times the candidate large itemset is present in the database;

computer readable code means for entering a candidate large itemset into a next forward set of large itemsets only when the number of times the candidate large itemset is present in the database is greater than the minimum support value;

computer readable code means for, at least for some of the itemsets in the next forward set of large itemsets, determining the number of times selected subsets of the itemsets appear in the database; and computer readable code means for outputting an association rule when the ratio of the number of times a selected subset having a plurality of items appears in the database to the number of times the associated itemset appears in the database exceeds a predetermined minimum confidence value and thereby satisfies a minimum confidence constraint.

7. The computer program product of claim 6, wherein the computer usable code means includes computer readable code means for iteratively repeats selected functions, and each itemset in the next set of candidate large itemsets is compared by the computer readable code means for comparing either to the itemsets in the database or to a previous set of candidate large itemsets.

8. The computer program product of claim 6, wherein each transaction is characterized by a unique transaction identifier, and candidate large itemsets in the next set of candidate large itemsets are associated with one of the transaction identifiers.

9. The computer program product of claim 6, wherein the computer code means for determining and outputting iteratively operate, and in a first iteration the selected subsets of the itemsets in the next forward set of large itemsets each contain one item.

10. The computer program product of claim 9, wherein in a first iteration the selected subsets each contain one item, and in a second iteration the selected subsets are supersets only of those subsets found in the first iteration to have satisfied the minimum confidence constraint.

11. A method executable by a digital processing apparatus in response to a program of instructions executable by the digital processing apparatus for identifying association rules of itemsets stored in a database and having more than one item so as to discover customer purchasing tendencies, the method comprising:

identifying large itemsets in the database as those itemsets recurring with at least a user-defined minimum support;

discovering association rules between the large itemsets and subsets thereof when the ratio of subset recurrence to itemset recurrence at least equals a user-defined confidence; and outputting the association rules as representative of customer purchasing tendencies each association rule including, as a consequent, a subset having a plurality of items.

12. The method of claim 11, wherein identifying large itemsets comprises:

constructing a multi-level hashing data structure containing the large itemsets and entering an itemset into a set of large itemsets when the number of times the itemset is present in the database exceeds a predefined minimum support value;

concatenating itemsets in the set of large itemsets in accordance with a predetermined concatenation regime to generate a next set of candidate large itemsets;

comparing each itemset in the next set of candidate large itemsets to the itemsets in the database to determine the number of times the candidate large itemset is present in the database; and entering a candidate large itemset into a next forward set of large itemsets only when the number of times the candidate large itemset is present in the database is greater than the minimum support value.

13. The method of claim 12, wherein discovering association rules includes:

for at least some of the itemsets in the next forward set of large itemsets, determining the number of times selected subsets of the itemsets appear in the database.

14. The method of claim 13, wherein the method iteratively repeats selected steps, and comparing includes comparing each itemset in the next set of candidate large itemsets either to the itemsets in the database or to a previous set of candidate large itemsets.

15. The method of claim 13, wherein each transaction is characterized by a unique transaction identifier, and candidate large itemsets in the next set of candidate large itemsets are associated with one of the transaction identifiers.

16. The method of claim 13, wherein the discovering step is iteratively repeated, and in a first iteration the selected subsets of the itemsets in the next forward set of large itemsets each contain one item.

17. The method of claim 16, wherein in a first iteration the selected subsets each contain one item, and in a second iteration the selected subsets are supersets only of those subsets found in the first iteration to have the user-defined confidence.

18. A database mining system for discovering association rules in itemsets stored in a database, each itemset including a plurality of items, the system comprising:

means for entering an itemset into a set of large itemsets when the number of times the itemset is present in the database exceeds a predefined minimum support value;

means for concatenating itemsets in the set of large itemsets in accordance with a predetermined concatenation regime to generate a next set of candidate large itemsets;

means for comparing each itemset in the next set of candidate large itemsets to the itemsets in the database to determine the number of times the candidate large itemset is present in the database;

means for entering a candidate large itemset into a next forward set of large itemsets when the number of times the candidate large itemset is present in the database is greater than the minimum support value;

means for entering at least some of the itemsets in the next forward set of large itemsets, determining the number of times selected subsets of the itemsets appear in the database; and means for outputting an association rule when the ratio of the number of times a selected subset having a plurality of items appears in the database to the number of times the associated itemset appears in the database exceeds a predetermined minimum confidence value and thereby satisfies a minimum confidence constraint.

19. A computer-based system for discovering purchasing tendencies of consumers by identifying association rules between itemsets of transactions and subsets of the itemsets, the subsets including one or more items, comprising:

a multi-level hash tree data structure accessible by the computer for electronically storing the itemsets;

a large itemset generator accessing the database for determining a first number of times an itemset appears in the database and for designating the itemset as a large itemset when the first number of times exceeds a minimum support value; and an association rule discoverer accessing the large itemset generator for determining a second number of times at least one subset having a plurality of items of an itemset appears in the database, the association rule discoverer outputting an association rule representative of purchasing tendencies of consumers when the ratio of the first number of times to the second number of times equals a predetermined minimum confidence value.

* * * * *

UNITED STATES PATENT AND TRADEMARK OFFICE
CERTIFICATE OF CORRECTION

PATENT NO. : 5,794,209
DATED : August 11, 1998
INVENTOR(S) : Agrawal et al

It is certified that error appears in the above-indentified patent and that said Letters Patent is hereby corrected as shown below:

Column 14, line 20, change "repeats" to --repeating--.

Signed and Sealed this

Seventeenth Day of November, 1998

Attest:

BRUCE LEHMAN

Attesting Officer    Commissioner of Patents and Trademarks